United States Patent
Park et al.

(10) Patent No.: US 8,130,827 B2
(45) Date of Patent: Mar. 6, 2012

(54) METHOD AND APPARATUS FOR INTERPOLATING A REFERENCE PIXEL IN AN ANNULAR IMAGE AND ENCODING/DECODING AN ANNULAR IMAGE

(75) Inventors: Gwang-Hoon Park, Seongnam-si (KR); Sung-Keun Kim, Seoul (KR)

(73) Assignees: Samsung Electronics Co., Ltd., Suwon-si (KR); Industry Academic Cooperation Foundation Kyunghee University, Youngin-si (KR)

(*) Notice: Subject to any disclaimer, the term of this patent is extended or adjusted under 35 U.S.C. 154(b) by 1440 days.

(21) Appl. No.: 11/201,207

(22) Filed: Aug. 11, 2005

(65) Prior Publication Data
US 2006/0034370 A1    Feb. 16, 2006

(30) Foreign Application Priority Data

Aug. 13, 2004  (KR) .................. 10-2004-0063887
Aug. 9, 2005   (KR) .................. 10-2005-0072967

(51) Int. Cl.
*H04N 7/12* (2006.01)
(52) U.S. Cl. ............... 375/240.03; 348/333.11; 382/157
(58) Field of Classification Search ............. 375/240.03; 348/333.11; 382/157
See application file for complete search history.

(56) References Cited

U.S. PATENT DOCUMENTS

| | | | | |
|---|---|---|---|---|
| 5,067,019 | A  * | 11/1991 | Juday et al. | 348/580 |
| 5,602,584 | A    | 2/1997  | Mitsutake et al. | |
| 5,691,765 | A  * | 11/1997 | Schieltz et al. | 348/335 |
| 6,057,847 | A    | 5/2000  | Jenkins | |
| 6,205,259 | B1   | 3/2001  | Komiya et al. | |
| 6,671,400 | B1 * | 12/2003 | Ekpar et al. | 382/157 |
| 7,116,830 | B2 * | 10/2006 | Srinivasan | 382/236 |
| 2006/0055807 | A1 * | 3/2006 | Pemer | 348/333.11 |

FOREIGN PATENT DOCUMENTS

| | | |
|---|---|---|
| JP | 2002-312778 | 10/2002 |
| JP | 2004-080185 | 3/2004 |
| KR | 2001-24698  | 3/2001 |

* cited by examiner

OTHER PUBLICATIONS

PCT International Search Report, dated Nov. 24, 2005.

*Primary Examiner* — Jay Au Patel
*Assistant Examiner* — James Pontius
(74) *Attorney, Agent, or Firm* — Roylance, Abrams, Berdo & Goodman, LLP

(57) ABSTRACT

A method and apparatus are disclosed for interpolating an object reference pixel in an annular image. In one embodiment, reference pixels selected based on a distorted shape of the annular image are arranged in a direction of distortion of the annular image and an object reference pixel in the annular image is interpolated based on the selected reference pixels.

14 Claims, 15 Drawing Sheets

FIG. 1 (PRIOR ART)
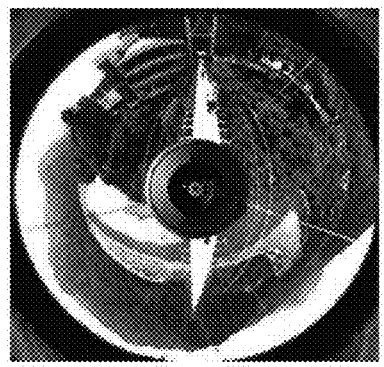
FIG. 2A (PRIOR ART)    FIG. 2B (PRIOR ART)
    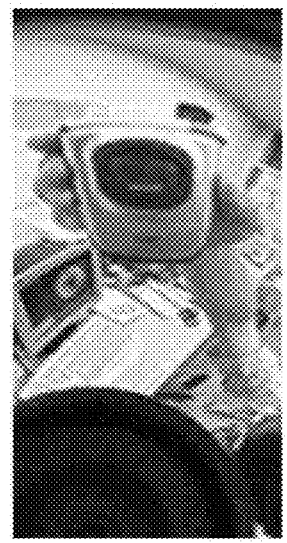

FIG. 16A (PRIOR ART)
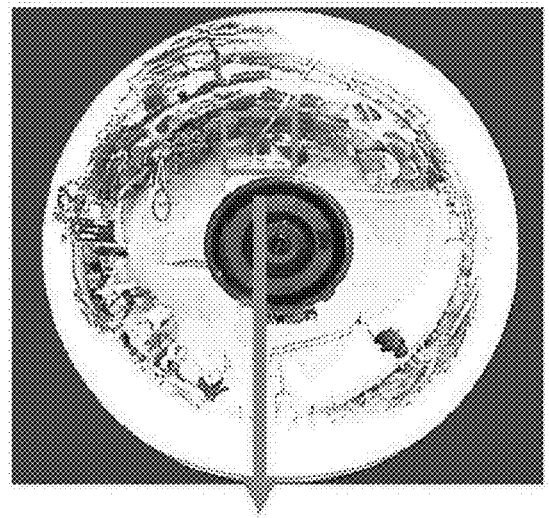
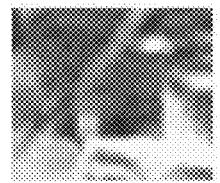
H.264
FIG. 16B
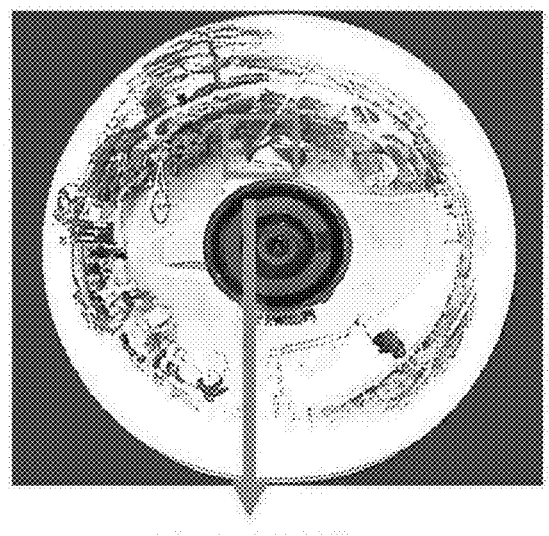
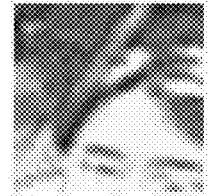
SUGGESTED ALGORITHM

METHOD AND APPARATUS FOR INTERPOLATING A REFERENCE PIXEL IN AN ANNULAR IMAGE AND ENCODING/DECODING AN ANNULAR IMAGE

PRIORITY

This application claims the benefit under 35 U.S.C. 119(a) of Korean Patent Application No. 10-2004-0063887, filed on Aug. 13, 2004, in the Korean Intellectual Property Office, and Korean Patent Application No. 10-2005-0072967, filed in the Korean Intellectual Property Office on Aug. 9, 2005, the entire contents of which are hereby incorporated by reference.

BACKGROUND OF THE INVENTION

1. Field of the Invention

The present invention relates to a method and apparatus for interpolating a reference pixel in an annular image and for encoding/decoding an annular image.

2. Description of the Related Art

With the development of various digital technologies relating to hardware and software, the age where independent communication media are used has gone, and the Ubiquitous Age where people can receive online any service anywhere and at any time is coming. Users in the Ubiquitous Age desire to freely obtain and use information as they use parts of their bodies. As a prelude, interactive broadcasting and three-dimensional (3D) broadcasting are being researched and developed more actively than ever before. For interactive broadcasting and 3D broadcasting, 3D video camera systems such as stereoscopic camera systems, omnidirectional video systems, or multiview camera systems are required.

To standardize the compression of a 3D image obtained from a 3D video camera system, the Moving Picture Expert Group (MPEG) has established 3D Audio Visual (3DAV) Exploration Experiments (EE)-1 through EE-4, which are currently under research. In 3DAV EE-1, research on omnidirectional-video compression is being performed, but only the topic of image transformation is handled.

Because conventional video compression methods such as MPEG-1, MPEG-2, MPEG-4, H.263, and H.264 have been designed for two-dimensional (2D) images, they cannot be applied to the compression of 3D images, in particular, omnidirectional-video compression. Unlike a general picture, an annular image created using a hyperboloid mirror includes 360° of information and has a unique circular distortion. Due to the characteristic of the annular image, the use of a conventional 2D video coding algorithm for an annular image would lead to degradation in the efficiency of prediction and compression of the image.

An annular image is obtained by reflecting an image off a mirror and capturing the reflected image by a camera in a mirror-based camera system using omnidirectional cameras. An annular image includes 360° of whole view information. FIG. 1 illustrates an example of an annular image. The annular image can be captured using an omnidirectional image sensor which can receive 360°-whole view information from the center of projection unlike conventional image sensors having a limited field of view (FOV).

If a codec for a general 2D image is applied to an annular image, the efficiency of a prediction algorithm such as intra-prediction and interprediction using spatial and temporal correlations is degraded due to the spatial distortion resulting from the characteristic of the annular image. This is because the degree of distortion of the annular image is greater than that of the 2D image. For example, when an object moves vertically as shown in FIGS. 2A and 2B, as long as a distance between a camera and the object is maintained constant, the shape of the object is not distorted in a 2D image even when the object moves. However, the shape of the object is easily distorted due to the characteristic of a hyperboloid mirror in an omnidirectional camera.

Since the annular image spatially has a distortion ratio similar to number π, the spatial correlation degrades, causing a significant reduction in the efficiency in interprediction. Since the shape of the object is not maintained constant, but is severely distorted by a temporal movement as shown in FIGS. 2A and 2B, the temporal correlation degrades. For these reasons, it is difficult to accurately match motion vectors, and a reference pixel having low spatial correlation is referred to during ½ or ¼ pixel-based interpolation, causing degradation of the coding efficiency.

In the following description, existing prediction methods will be introduced based on H.264, which is one of the 2D moving picture coding methods.

Interprediction creates a prediction model from at least one previously-encoded video frame or field using block-based motion compensation.

A partition and a sub-partition of an inter-coded macroblock are predicted from a partition and a sub-partition of a reference image which have the same sizes and positions as those of the partition and the sub-partition of the inter-coded macroblock. With regard to positions, luminance components have a ¼-pixel resolution and chrominance components have a ⅛-pixel resolution. Since samples corresponding to luminance and chrominance component samples at a sub-sample position cannot be found in a reference image, the luminance and chrominance component samples are interpolated using adjacent coded samples.

Referring to FIG. 3A, a 4×4 block of a current frame is predicted from an area around a corresponding 4×4 block of a reference image. If both horizontal and vertical components of a motion vector are integers (1, −1), appropriate reference block samples exist in the form of gray dots in the reference image, as shown in FIG. 3B. If one or two components of a motion vector are decimals (0.75, −0.5), prediction samples expressed by gray dots are interpolated between adjacent samples such as white dots, in a reference frame, as shown in FIG. 3C.

Luminance component interpolation in units of a ¼ pixel is directed to obtaining a luminance component at a ½ pixel position by applying a 6-tap filter having a coefficient of (1, −5, 20, 20, −5, 1) in horizontal and vertical directions of a luminance pixel at an integer position and obtaining a ¼ pixel-based luminance sample by averaging samples at an integer position and a ½ pixel position. Since a chrominance component has a resolution that is half of that of a luminance component, when a ¼ pixel-based motion vector of the luminance component is used for motion compensation of the chrominance component, it is recognized as a ⅛ pixel-based motion vector. Thus, chrominance component interpolation in units of a ⅛ pixel is required.

For interpolation, pixel values are calculated using the following equations. A pixel b in FIG. 4 is calculated using equation (1):

$$b = \text{round}(E - 5F + 20G + 20H - 5I + J)/32) \quad (1)$$

After the luminance component at a ½ pixel position is obtained using the 6-tap filter, a ¼ pixel a is calculated as follows:

$$a = \text{round}(G + b + 1)/2)$$

For example, referring to FIG. 5A, the pixel a is obtained using a pixel G and the pixel b, referring to FIG. 5B, a pixel d is obtained using the pixel G and a pixel h, and referring to FIG. 5C, a pixel e is obtained using the pixel b and the pixel h.

As such, according to a conventional interpolation method, interpolation is performed using reference pixels in a horizontal or vertical direction without considering the distortion characteristic of an image. However, when interpolation is performed on an annular image using reference pixels in a horizontal or vertical direction like in the conventional interpolation method, spatial correlation is degraded and thus prediction of a pixel is not correctly performed. For example, as shown in FIGS. 6A and 6B, blocking effects arise.

FIGS. 6A and 6B are reference diagrams illustrating blocking effects in interprediction of an annular image according to the prior art.

Since a basic processing unit of all moving picture codecs is a 2D square block or macroblock, errors as shown in FIGS. 6A and 6B occur when an annular image having circular distortion is processed. In FIGS. 6A and 6B, interprediction data of an annular image extracted from a H.264 baseline profile are shown. Referring to FIG. 6B, a portion of a human face shape is empty. The blocking effects as shown in FIGS. 6A and 6B occur because coordinates from which reference pixels of a 6-tap filter of a ½ pixel and a ¼ pixel used in interprediction have low spatial correlation.

SUMMARY OF THE INVENTION

The present invention provides a method and apparatus for interpolating a reference pixel in an annular image, in which interprediction of the annular image can be effectively performed through interpolation using spatial correlation of the annular image based on the distortion characteristic of the annular image, and a method and apparatus for encoding/decoding an annular image.

According to an exemplary aspect of the present invention, there is provided a method of interpolating an object reference pixel in an annular image. The method comprises selecting a plurality of reference pixels arranged in a direction of the distortion of the annular image and interpolating the object reference pixel to be interpolated based on the selected plurality of reference pixels.

The plurality of reference pixels may be arranged along the circumference of a circle having a radius between the center of the annular image and the object reference pixel and are located within a predetermined distance from the object reference pixel.

The selection of the plurality of reference pixels may comprise selecting the plurality of reference pixels using the positions of the plurality of reference pixels, which are determined using a predetermined equation or selecting the plurality of reference pixels using a table that stores the positions of the plurality of reference pixels arranged along the circumference of the circle.

The interpolation of the object reference pixel may comprise applying different predetermined weights to the plurality of reference pixels and obtaining the object reference pixel by adding the reference pixels to which the different predetermined weights are applied.

According to another aspect of the present invention, there is provided an apparatus for interpolating an object reference pixel in an annular image. The apparatus comprises a reference pixel selecting unit and an interpolating unit. The reference pixel selecting unit selects a plurality of reference pixels arranged in a direction of the distortion of the annular image. The interpolating unit interpolates the object reference pixel to be interpolated based on the selected plurality of reference pixels.

According to still another exemplary aspect of the present invention, there is provided a method of encoding an annular image. The method comprises interpolating an object reference pixel to be interpolated based on a plurality of reference pixels arranged along the circumference of a circle having a radius between the center of the annular image and the position of the object reference pixel to perform motion estimation on the annular image, thereby determining a prediction macroblock for a current macroblock and performing a discrete cosine transform (DCT) on a difference between the prediction macroblock and the current macroblock, quantizing DCT coefficients, reordering the quantized DCT coefficients, and entropy-encoding the reordered DCT coefficients.

According to yet another exemplary aspect of the present invention, there is provided an apparatus for encoding an annular image. The apparatus comprises a motion estimation and compensation unit, a discrete cosine transform (DCT) unit, a quantization unit, a reordering unit, and an entropy encoding unit. The motion estimation and compensation unit interpolates an object reference pixel to be interpolated based on a plurality of reference pixels arranged along the circumference of a circle having a radius between the center of the annular image and the position of the object reference pixel to perform motion estimation on the annular image, thereby determining a prediction macroblock for a current macroblock. The DCT unit performs DCT on a difference between the prediction macroblock and the current macroblock. The quantization unit quantizes DCT coefficients. The reordering unit reorders the quantized DCT coefficients. The entropy encoding unit entropy-encodes the reordered DCT coefficients.

According to yet another exemplary aspect of the present invention, there is provided a method of decoding an annular image. The method comprises entropy-decoding a received encoded bitstream, reordering entropy-decoded data samples, inversely quantizing the reordered data samples, and performing inverse discrete cosine transform (DCT) on the inversely quantized data samples, thereby generating inverse DCT coefficients, interpolating an object reference pixel to be interpolated based on a plurality of reference pixels arranged along the circumference of a circle having a radius between the center of the annular image and the position of the object reference pixel, thereby determining a prediction macroblock for a current macroblock, and adding a macroblock composed of the inverse DCT coefficients and the prediction macroblock.

According to still another exemplary aspect of the present invention, there is provided an apparatus for decoding an annular image. The apparatus comprises an entropy decoding unit, a reordering unit, an inverse quantization unit, an inverse discrete cosine transform (DCT) unit, a motion compensation unit, and an adder. The entropy decoding unit entropy-decodes a received encoded bitstream. The reordering unit reorders entropy-decoded data samples. The inverse quantization unit inversely quantizes the reordered data samples. The inverse DCT unit generates inverse DCT coefficients by performing inverse DCT on the inversely quantized data samples. The motion compensation unit interpolates an object reference pixel to be interpolated based on a plurality of reference pixels arranged along the circumference of a circle having a radius between the center of the annular image and the position of the object reference pixel, thereby determining a prediction macroblock for a current macroblock.

The adder adds a macroblock composed of the inverse DCT coefficients and the prediction macroblock.

BRIEF DESCRIPTION OF THE DRAWINGS

The above and other features and advantages of the present invention will become more apparent by describing in detail exemplary embodiments thereof with reference to the attached drawings in which:

FIG. 1 illustrates an example of a conventional annular image;

FIGS. 2A and 2B are reference diagrams illustrating distortion of a conventional two dimensional (2D) image due to the vertical movement of an object;

FIG. 16A illustrates a prediction result of H.264 according to the prior art; and FIG. 16B illustrates a prediction result of H.264 according to an embodiment of the present invention.

Throughout the drawings, the same or similar elements are denoted by the same reference numerals.

DETAILED DESCRIPTION OF EXEMPLARY EMBODIMENTS

Figure 3A:
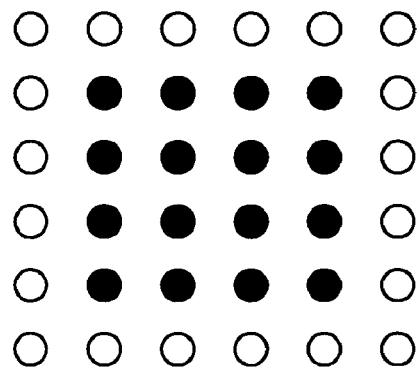
FIGS. 3A through 3C are reference diagrams illustrating conventional integer-pixel and sub-pixel prediction.
Figure 3B:
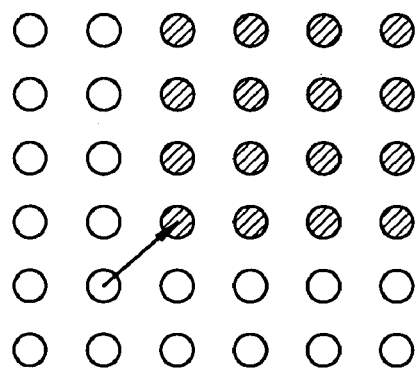
Figure 3C:
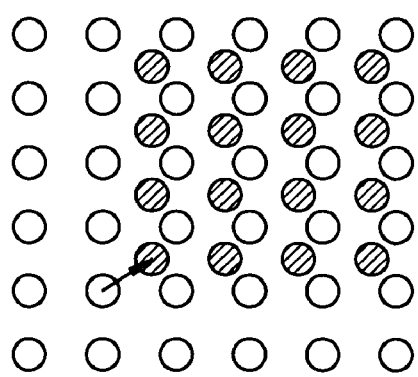
Figure 4:
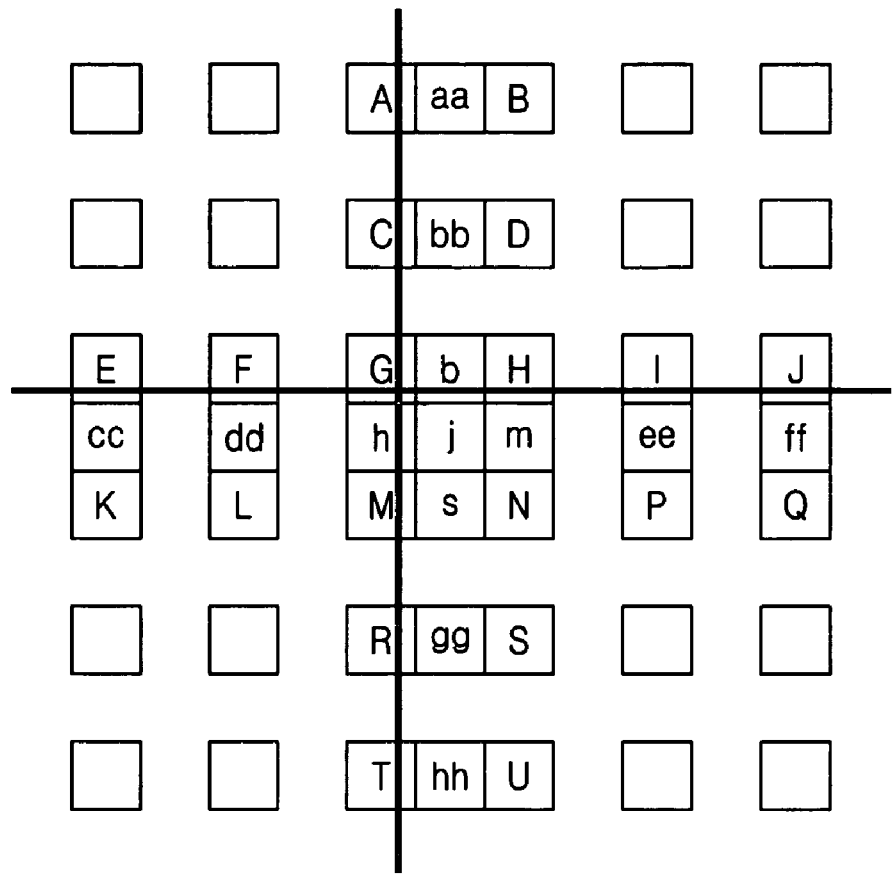
FIG. 4 is a reference diagram illustrating directions of a ½ reference pixel according to the prior art.
Figure 5A:
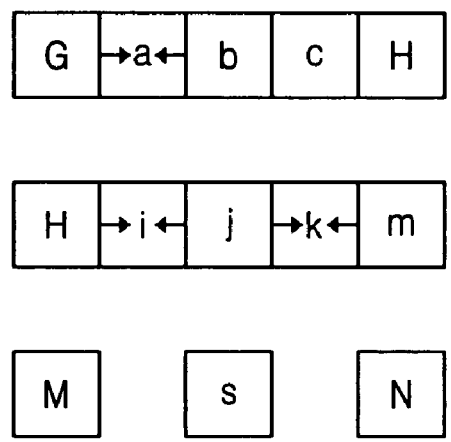
FIGS. 5A through 5C are reference diagrams illustrating interpolation at a ¼ pixel position according to the prior art.
Figure 5B:
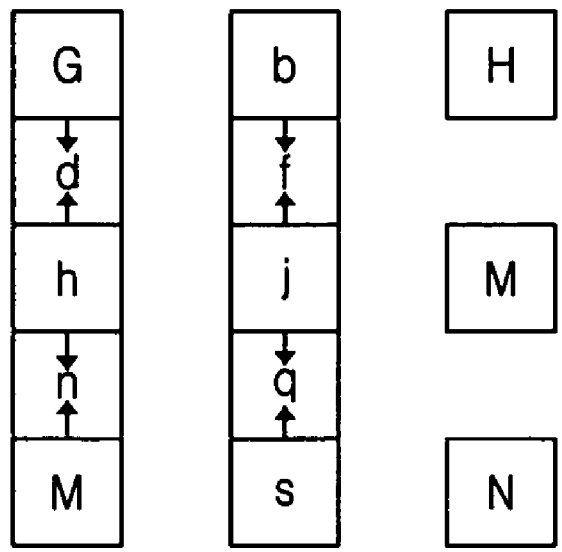
Figure 5C:
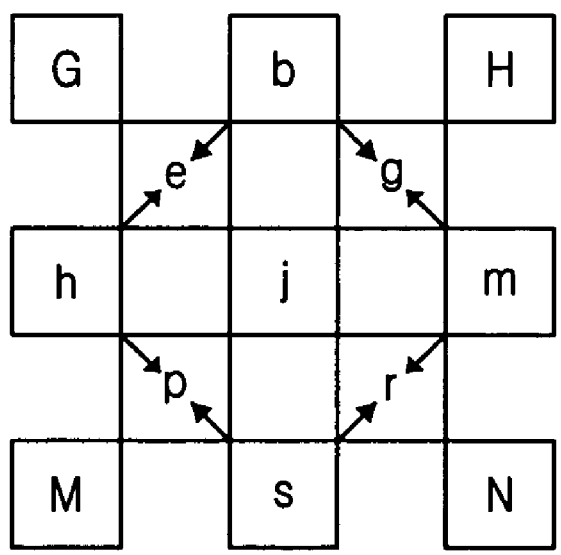
Figure 6A:
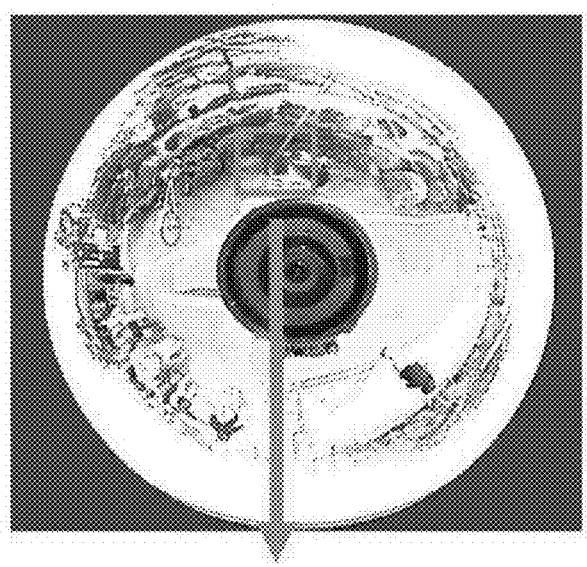
FIGS. 6A and 6B are reference diagrams illustrating blocking effects in interprediction of an annular image according to the prior art.
Figure 6B:
Figure 7:
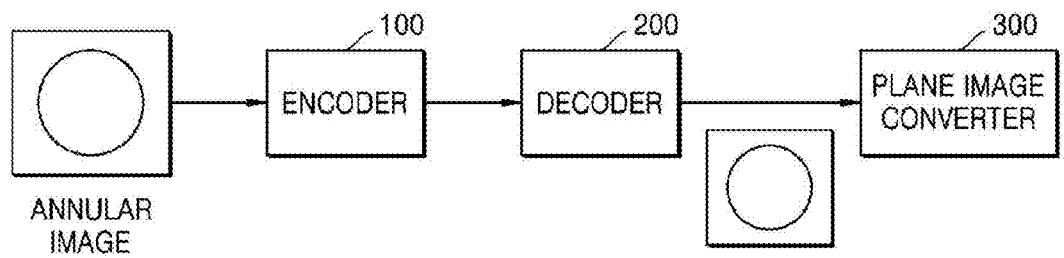
FIG. 7 is a schematic block diagram of exemplary an encoding/decoding system according to an exemplary embodiment of the present invention.

FIG. 7 is a schematic block diagram of an exemplary encoding/decoding system according to an exemplary embodiment of the present invention.

An encoder 100 according to according to an exemplary embodiment of the present invention receives an annular image and performs interpolation in interprediction based on the direction of the distortion of the annular image, thereby encoding the annular image. The encoded annular image is received by a decoder 200 through a network and the decoder 200 performs interpolation in interprediction based on the direction of the distortion of the encoded annular image, thereby decoding the encoded annular image. The decoded annular image is converted into a plane image by a plane image converter 300 and is then output to a user.

The encoding/decoding system according to an exemplary embodiment of the present invention performs interpolation using reference pixels based on a distorted shape of an annular image, instead of using reference pixels in a vertical or horizontal direction, during encoding and decoding of the annular image, thereby effectively performing prediction with the maximal use of the characteristic of the annular image.

Figure 8:
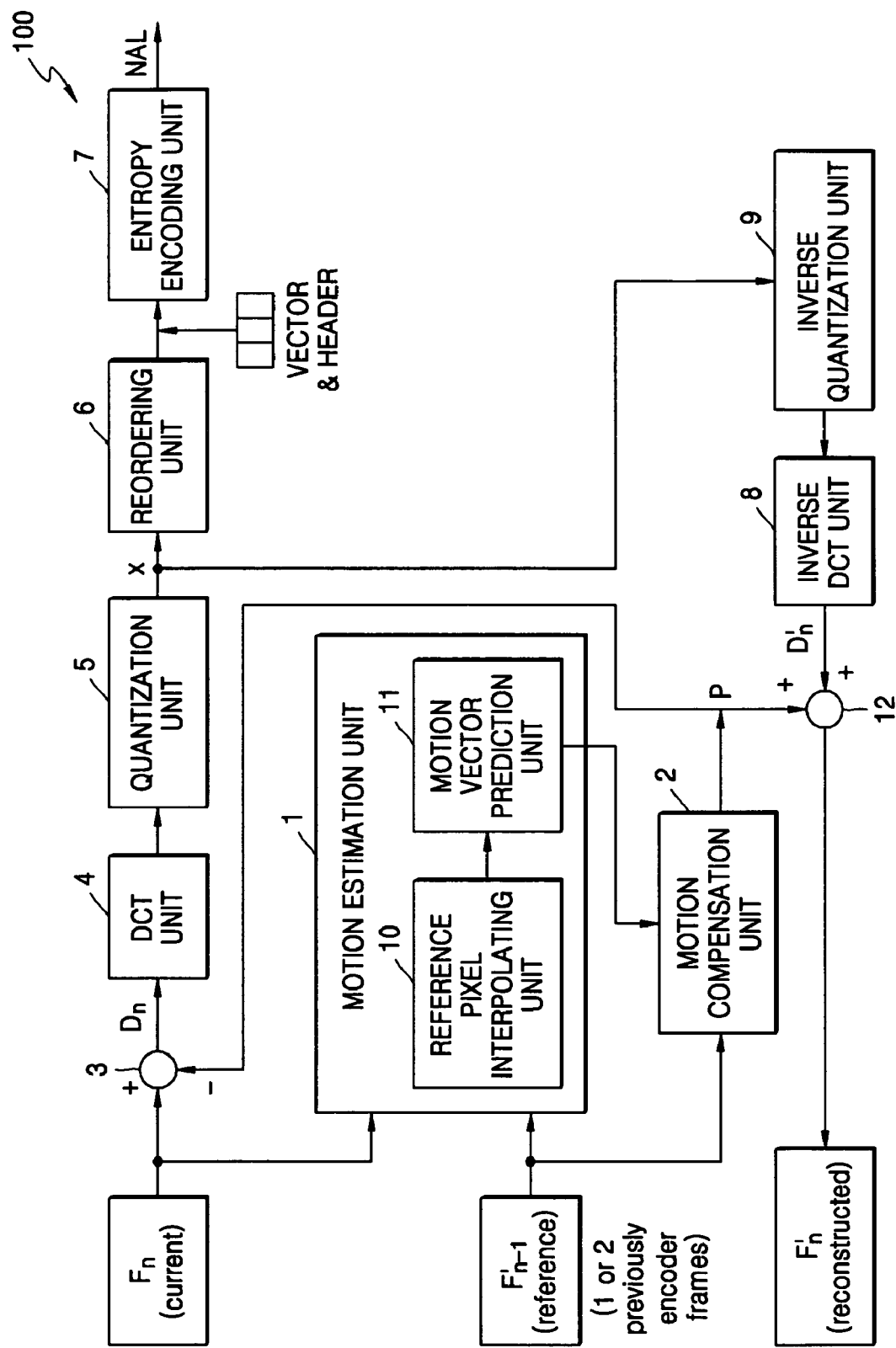
FIG. 8 is a detailed block diagram of an exemplary encoder according to an exemplary embodiment of the present invention.

FIG. 8 is a detailed block diagram of the exemplary encoder 100 according to an exemplary embodiment of the present invention.

Referring to FIG. 8, the encoder 100 comprises a motion estimation unit 1, a motion compensation unit 2, an adder 3, a discrete cosine transform (DCT) unit 4, a quantization unit 5, a reordering unit 6, an entropy encoder 7, an inverse quantization unit 9, an inverse DCT unit 8, and an adder 12.

The encoder 100 comprises two data flow paths. One of the data flow paths is a forward path progressing from left to right and the other is a reconstruction path progressing from right to left.

First, the forward path will be described.

An input video frame $F_n$ to be encoded is processed in units of a macroblock (corresponding to a 16×16 luminance area and a color difference associated with the 16×16 luminance area).

The motion estimation unit 1 compares the current video frame $F_n$ and a reference frame $F'_{n-1}$ that has been previously encoded to select a 16×16 reference area that is determined to be the same as or similar to a current macroblock of the current video frame $F_n$ from the reference frame $F'_{n-1}$. A difference between the position of the current macroblock and the position of the selected 16×16 reference area is a motion vector.

The motion estimation unit 1 comprises a reference pixel interpolation unit 10 and a motion vector prediction unit 11. A current macroblock of a current frame is predicted from an area of a reference frame which is adjacent to the position of the current macroblock. When a horizontal motion vector and a vertical motion vector are integers, associated samples actually exist in a reference macroblock. However, when one or two vectors are decimals, the reference pixel interpolation unit 10 generates a prediction sample through interpolation between adjacent samples in the reference frame. In particular, according to an exemplary embodiment of the present invention, the reference pixel interpolation unit 10 interpolates a reference pixel based on the distortion of an annular image in view of the fact that an input image is an annular image. In other words, the reference pixel interpolation unit 10 performs interpolation using reference pixels arranged in the direction of the distortion of the annular image, instead of using reference pixels in a horizontal or vertical direction. Here, the reference pixels arranged in the direction of the distortion of the annular image indicate a plurality of pixels that are arranged along the circumference of a circle having a radius between the center of the annular image and a reference pixel to be interpolated and are adjacent to the reference pixel to be interpolated.

The motion vector prediction unit 11 selects a reference area determined to be most similar to the current macroblock from the reference frame $F'_{n-1}$, comprising a pixel interpolated by the reference pixel interpolating unit 10 and predicts a difference between the position of the current macroblock and the selected reference area as a motion vector.

The motion compensation unit 2 generates a prediction macroblock P (i.e., the 16×16 reference area selected through motion estimation) that is motion compensated according to the predicted motion vector.

The adder 3 subtracts the prediction macroblock P from the current macroblock, thereby generating a difference macroblock $D_n$.

The difference macroblock $D_n$ is transformed by the DCT unit 4 and quantized by the quantization unit 5 to generate a quantized transform coefficient X. Quantized transform coefficients X are reordered and run-level coded by the reordering unit 6, and entropy coded by the entropy encoding unit 7. Entropy coded coefficients generate a compressed bitstream, along with additional information required for decoding a macroblock. The addition information comprises motion vector information and header information. The compressed bitstream is transmitted to a network abstraction layer (NAL) for transmission or storage.

The reconstruction path is as follows.

Encoded coefficients X are decoded for reconstruction of a frame used to encode another macroblock. In other words, the encoded coefficients X are inversely quantized by the inverse quantization unit 9 and inversely transformed by the inverse DCT unit 8, thus generating a difference macroblock $D_n'$. The difference macroblock $D_n'$ is different from the original difference macroblock $D_n$ under the influence of signal loss.

The prediction macroblock P is added to the difference macroblock $D_n'$ by the adder 12, thereby generating a reconstructed macroblock. The reconstructed macroblock is a distorted version of the original macroblock. To reduce the effect of distortion, a filter (not shown) is further included and a reconstructed reference frame may be generated from a macroblock $F'_n$.

Figure 9:
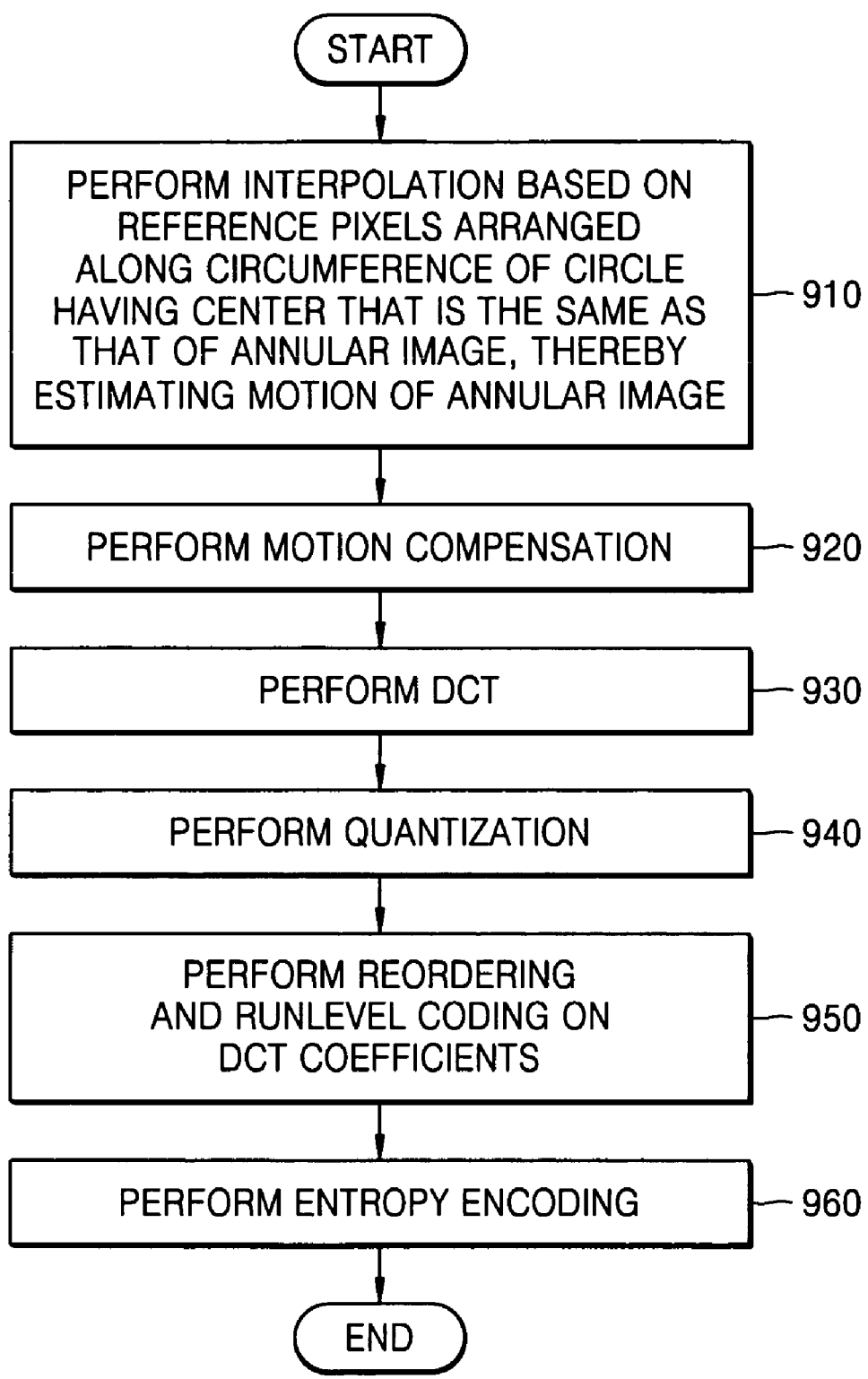
FIG. 9 is a flowchart illustrating an exemplary operation of the encoder of FIG. 8 according to an exemplary embodiment of the present invention.

FIG. 9 is a flowchart illustrating an exemplary operation of the encoder 100 of FIG. 8 according to an exemplary embodiment of the present invention.

Referring to FIG. 9, in operation 910, the motion estimation 1 performs interpolation based on a plurality of reference pixels arranged along the circumference of a circle having a center that is the same as that of an input annular image, thereby estimating motion of the annular image.

In operation 920, the motion compensation unit 2 performs motion compensation using a motion vector that is the result of the motion estimation, thereby generating a prediction macroblock. In operation 930, the DCT unit 4 performs DCT on a difference macroblock between the prediction macroblock and a current macroblock. The quantization unit 5 quantizes DCTed samples in operation 940. The reordering unit 6 recorders and runlevel-codes the quantized samples in operation 950 and the entropy encoding unit 7 entropy-encodes the resulting samples in operation 960.

Figure 10:
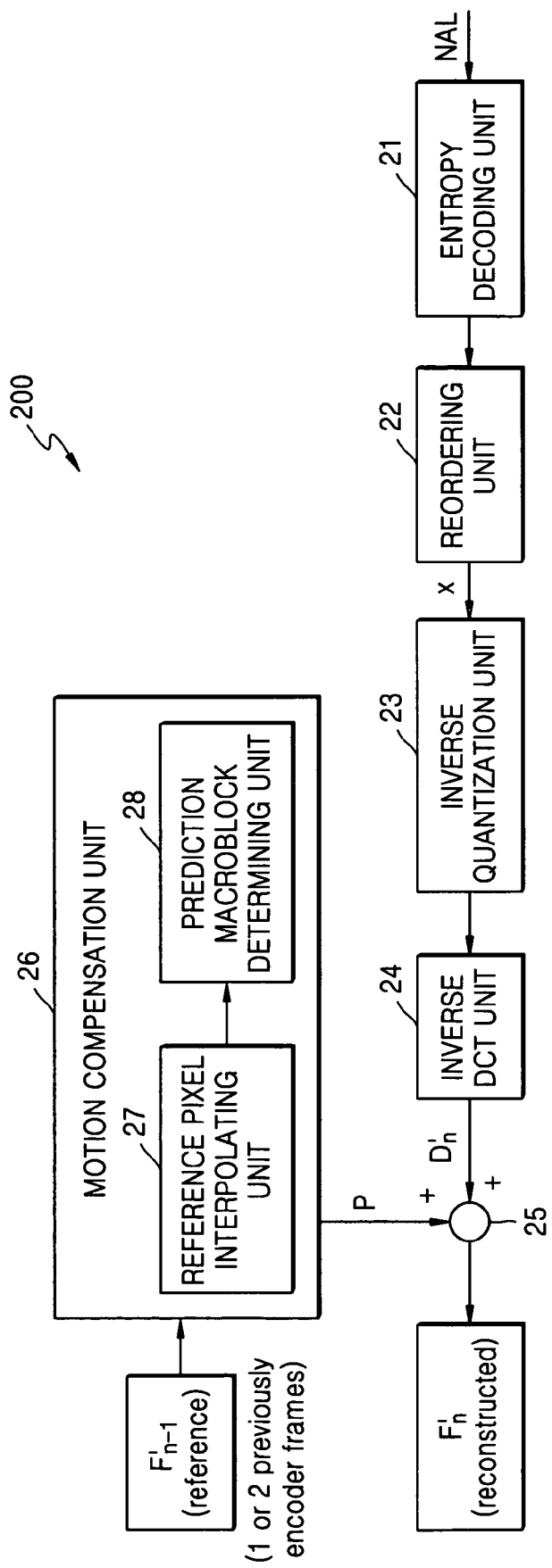
FIG. 10 is a detailed block diagram of an exemplary decoder according to an exemplary embodiment of the present invention.

FIG. 10 is a detailed block diagram of the exemplary decoder 200 according to an exemplary embodiment of the present invention.

Referring to FIG. 10, the decoder 200 comprises an entropy decoding unit 21, a reordering unit 22, an inverse quantization unit 23, an inverse DCT unit 24, an adder 25, and a motion compensation unit 26.

The entropy decoding unit 21 of the decoder 200 receives a compressed bitstream from a NAL and entropy-decodes the compressed bitstream to extract a coefficient, a motion vector, and a header for each macroblock.

The reordering unit 22 generates a transformed macroblock X by performing a process that is inverse to run-level coding and reordering of the encoder 100. The inverse quantization unit 23 inversely quantizes the macroblock X and the inverse DCT unit 24 performs inverse DCT on the inversely quantized macroblock X, thereby generating a difference macroblock $D'_n$.

The motion compensation unit 26 determines a motion-compensated prediction macroblock P using a motion vector to search in a previous reference frame of the decoder 200 for the position of a reference area.

The motion compensation unit 26 comprises a reference pixel interpolation unit 27 and a prediction macroblock determining unit 28. The reference pixel interpolation unit 27 functions similarly to the reference pixel interpolation unit 10 of the encoder 100. In other words, according to an exemplary embodiment of the present invention, the reference pixel interpolation unit 27 interpolates a reference pixel based on the distortion of an annular image in view of the fact that an input image is an annular image. In other words, the reference pixel interpolation unit 27 interpolates a reference pixel using reference pixels arranged in the direction of the distortion of the annular image, instead of using reference pixels in a horizontal or vertical direction. Here, the reference pixels arranged in the direction of the distortion of the annular image indicate a plurality of pixels that are arranged along the circumference of a circle having a radius between the center of the annular image and a reference pixel to be interpolated and are adjacent to the reference pixel to be interpolated. The prediction macroblock determining unit 28 determines a prediction macroblock P using a motion vector with respect to the interpolated reference pixel.

The adder 25 adds the difference macroblock $D'_n$ to the prediction macroblock P, thereby generating a reconstructed macroblock. The reconstructed macroblock is stored to generate a decoded frame $F'_n$.

Figure 11:
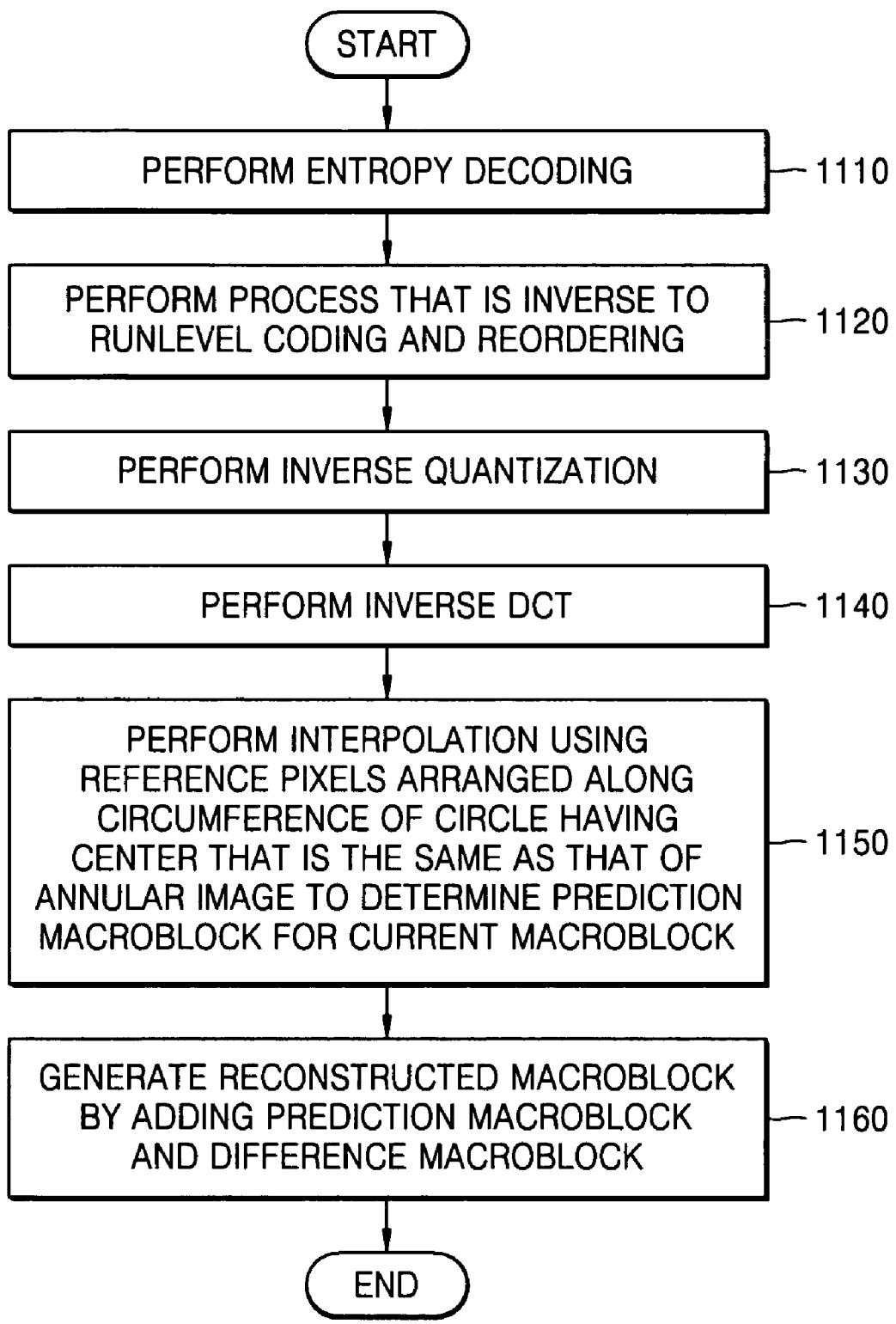
FIG. 11 is a flowchart illustrating an exemplary operation of the decoder of FIG. 10 according to an exemplary embodiment of the present invention.

FIG. 11 is a flowchart illustrating an exemplary operation of the decoder 200 of FIG. 10 according to an exemplary embodiment of the present invention.

Referring to FIG. 11, the entropy decoding unit 21 entropy-decodes the compressed bitstream received by the decoder 200 in operation 1110. The reordering unit 22 performs a process that is inverse to runlevel-coding and reorders entropy-decoded data samples in operation 1120. The inverse quantization unit 23 inversely quantizes the reordered samples in operation 1130 and the inverse DCT unit 24 performs inverse DCT on the quantized sample in operation 1140, thereby generating a difference macroblock $D'_n$.

The motion compensation unit 26 performs interpolation using a plurality of reference pixels arranged along the circumference of a circle having a center that is the same as that of the annular image to determine a prediction macroblock for a current macroblock in operation 1150. The adder 25 adds a difference macroblock $D'_n$ between the prediction macroblock and the current macroblock to the prediction macroblock P, thereby generating a reconstructed macroblock in operation 1160.

Hereinafter, interpolation based on the distortion characteristic of an annular image according to the present invention will be described in detail. In a method of interpolating a reference pixel according to the present invention, reference pixels arranged in the direction of the distortion of an annular image, instead of reference pixels in a vertical or horizontal direction, are used. Thus, since the positions of reference pixels arranged along a predetermined curved surface should be searched for, it is desirable to use a 2D polar coordinates system with respect to the positions of the reference pixels.

Figure 12A:
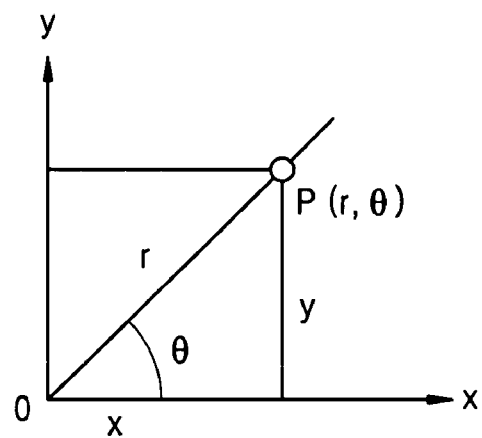
FIG. 12A illustrates a 2D polar coordinate system.

FIG. 12A illustrates a 2D polar coordinate system.

As shown in FIG. 12A, a 2D polar coordinate system or a plane polar coordinate system is determined by a distance from the origin and an azimuth angle. In FIG. 12A, r represents a distance from the origin to a point P and θ represents an azimuth angle measured in a counterclockwise direction from a horizontal axis. Thus, the position of the point P can be expressed as (r, θ), and r and θ are referred to as 2D polar coordinates.

Polar coordinates are useful to express the segmental movement of a human body originating from the movement of joints in the human body. Since segments of a human body rotate with respect to joints, it is more useful to use an azimuth angle than rectangular coordinates. However, r (distance) and θ (angle) cannot be expressed in the same coordinates system.

The relationship between 2D polar coordinates and 2D rectangular coordinates can be expressed as follows:

$$r = \sqrt{x^2 + y^2} \quad \text{or} \quad \begin{aligned} x &= r \cdot \cos\theta \\ y &= r \cdot \sin\theta \end{aligned}$$
$$\theta = \tan^{-1}\left[\frac{y}{x}\right]$$

Figure 12B:
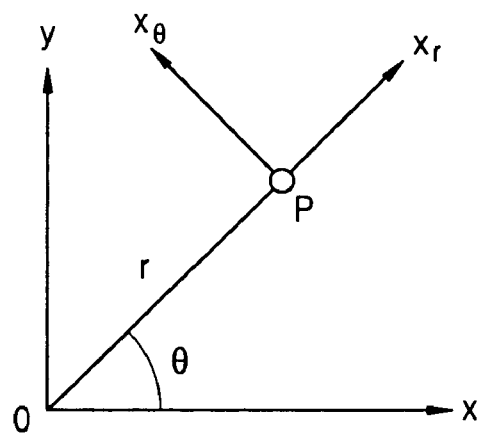
FIG. 12B illustrates directivities according to the movement of a point P.

In some cases, rectangular coordinates may be used like polar coordinates. An axis $X_r$ shown in FIG. 12B is a radius axis and $X_\theta$ is orthogonal to the axis $X_r$. Thus, the axes $X_r$ and $X_\theta$ constitute a rectangular coordinate system. It may be more useful to use a rectangular coordinate system since the advantages of both axes $X_r$ and $X_\theta$ can be taken. A movement in the direction of the axis $X_r$ indicates a movement in the direction of a radius, and a movement in the direction of the axis $X_\theta$ indicates a rotation.

In an exemplary method of interpolating a reference pixel in an annular image, based on the distortion characteristic of the annular image, the concepts of vertical and horizontal directions in a 2D image are substituted with the concepts using the same angle and the same radius.

Figure 12C:
FIGS. 12C and 12D are views for explaining the concepts of a horizontal direction in a 2D image and a circle ratio curve in a 3D annular image.
Figure 12D:

The concept of a horizontal direction in a 2D image as shown in FIG. 12C is converted into the concept of a curve to which the ratio of the circumference of a circle to its diameter is applied, as shown in FIG. 12D.

Here, the condition that a radius (r) of an equation of a 2D polar coordinate system is the same should be satisfied.

Figure 12E:
FIGS. 12E and 12F are views for explaining the concepts of a vertical direction in a 2D image and an angle in a 3D annular image.
Figure 12F:
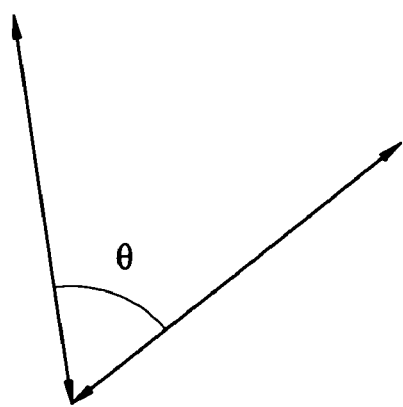

Further, the concept of a vertical direction in a 2D image as shown in FIG. 12D should have the same angle and form a straight line with an increase or a decrease in the radius (r), as shown in FIG. 12E.

½ pixel-based interpolation in each quadrant to which such concepts are applied will be taken as an example.

Figure 13A:
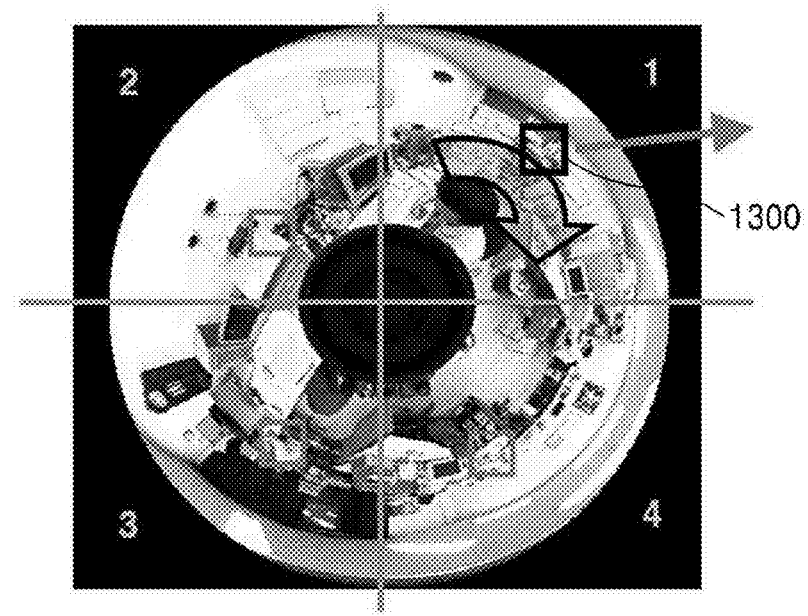
FIG. 13A illustrates directivities in the first quadrant of an annular image.

In the first quadrant of an annular image as shown in FIG. 13A, movement occurs, as indicated by a large arrow along a distorted shape.

Figure 13B:
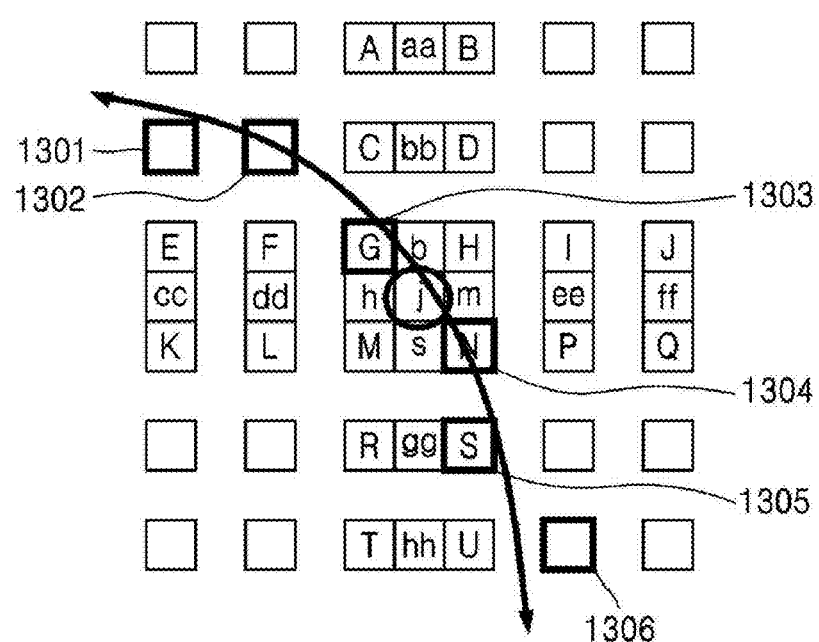
FIG. 13B illustrates exemplary positions of reference pixels in ½ pixel-based interpolation due to distortion shown in FIG. 13A according to an embodiment of the present invention.

FIG. 13B illustrates a portion of an area 1300 of the first quadrant of the annular image shown in FIG. 13A. For example, conventionally, to interpolate a pixel j, interpolation is performed by applying different weights to pixels cc, dd, h, m, ee, and ff. However, according to an exemplary embodiment of the present invention, interpolation is performed using pixels arranged substantially along a curved arrow shown in FIG. 13B. In other words, the pixel j according to an exemplary embodiment of the present invention is interpolated by applying weights to pixels 1301 through 1306. Pixels b, h, m, and s are also interpolated by referring to pixels arranged in the direction of the distortion of the annular image. Instead of referring to pixels in a vertical or horizontal direction, the positions of pixels to be referred to are changed like bolded squares of FIG. 13B. In addition, θ is found through a 2D polar coordinate transformation according to the position of a macroblock, a gradient is changed vertically, and thus reference pixels as shown in FIG. 13B are used.

Figure 14A:
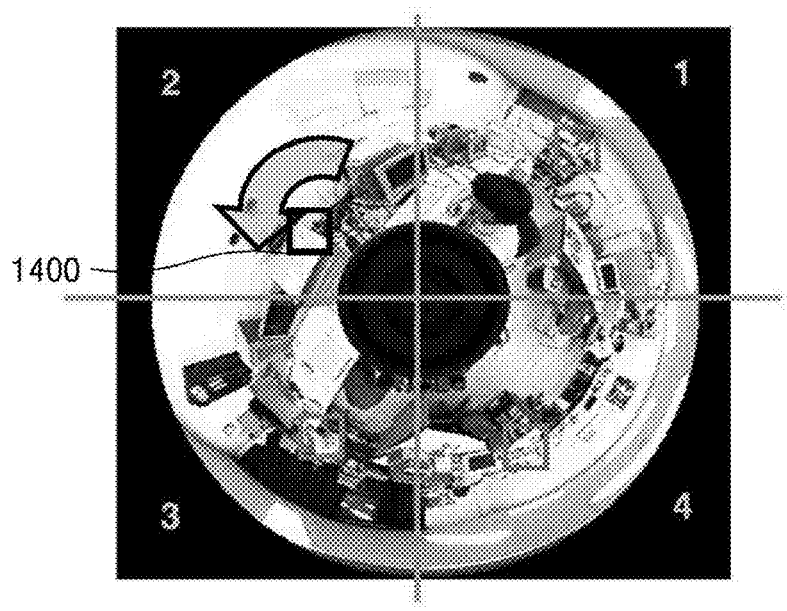
FIG. 14A illustrates directivities in the second quadrant of an annular image.

In the second quadrant of an annular image as shown in FIG. 14A, movement occurs as indicated by a large arrow along a distorted shape.

Figure 14B:
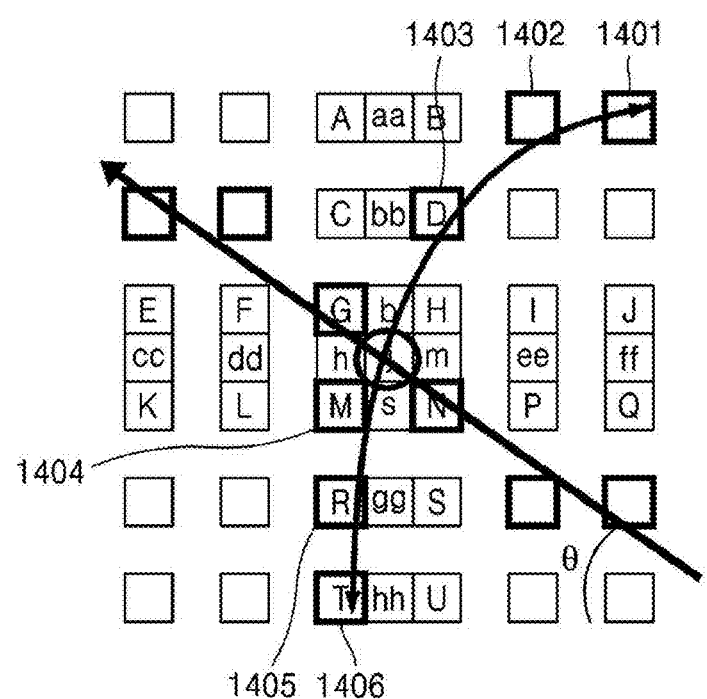
FIG. 14B illustrates exemplary positions of a reference pixel in ½ pixel-based interpolation due to distortion shown in FIG. 14A according to an embodiment of the present invention.

FIG. 14B illustrates a portion of an area 1400 of the second quadrant of the annular image shown in FIG. 14A. For example, conventionally, to interpolate a pixel j, interpolation is performed by applying different weights to pixels cc, dd, h, m, ee, and ff. However, according to an exemplary embodiment of the present invention, interpolation is performed using pixels arranged along a curved arrow shown in FIG. 14B. In other words, the pixel j according to an exemplary embodiment of the present invention is interpolated by applying different weights to pixels 1401 through 1406. Pixels b, h, m, and s are also interpolated by referring to pixels arranged in the direction of the distortion of the annular image.

In FIGS. 13A through 14B, only the first and second quadrants are used as examples, but it can be easily understood by those skilled in the art that a method of interpolating a ½ pixel using pixels arranged in the direction of the distortion of an annular image can also be applied to third and fourth quadrants.

Figure 15A:
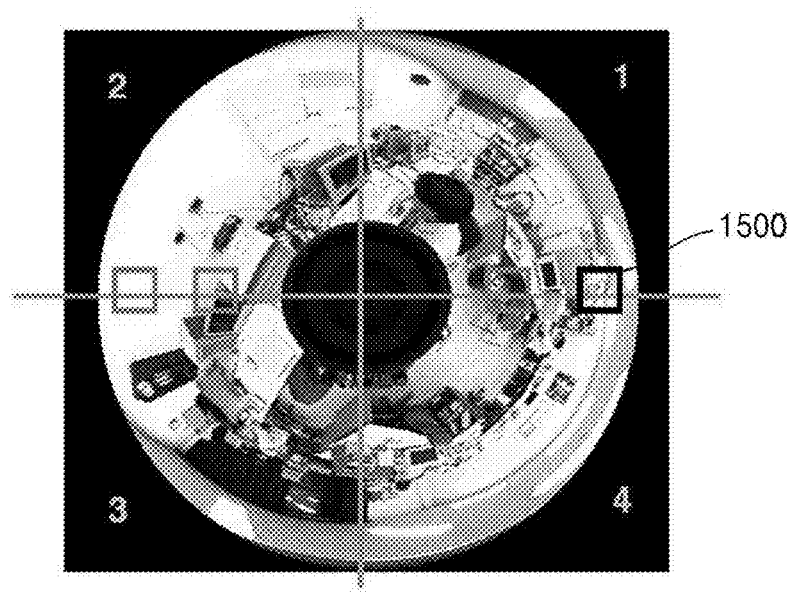
FIG. 15A illustrates directivities in a horizontal direction of an annular image.
Figure 15B:
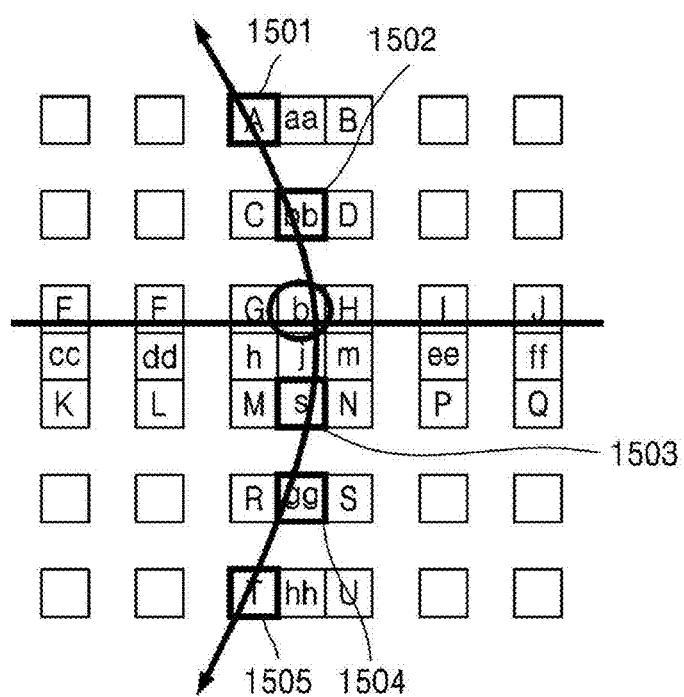
FIG. 15B illustrates exemplary positions of reference a pixel in ½ pixel-based interpolation due to distortion shown in FIG. 15A according to an embodiment of the present invention.

In an area 1500 at a boundary between the first quadrant and the fourth quadrant of an annular image shown in FIG. 15A, interpolation is performed using pixels arranged along an arrow shown in FIG. 15B.

FIG. 15B illustrates the area 1500 at the boundary between the first quadrant and the fourth quadrant of the annular image shown in FIG. 15A. For example, conventionally, to interpolate a pixel b, interpolation is performed by applying different weights to pixels E, F, G, H, I, and J arranged in the horizontal direction. However, according to an exemplary embodiment of the present invention, interpolation is performed using pixels arranged along a curved arrow shown in FIG. 15B. In other words, according to an exemplary embodiment of the present invention, the pixel b is interpolated by applying different weights to a pixel A 1501, a pixel bb 1502, a pixel s 1503, a pixel gg 1504, and a pixel T 1505. Pixels h, m, and s are also interpolated by referring to pixels arranged in the direction of the distortion of the annular image.

A method of interpolating a ½ pixel according to an exemplary embodiment of the present invention can be expressed as follows, using a predetermined number of pixels arranged in the direction of the distortion of an annular image.

½ pixel=round(($aA+bB+cC+dD+eE+fF$)/$K$)

When a 6-tap filter is used, A, B, C, D, E, and F indicate 6 pixels that are arranged in the direction of the distortion of an annular image and are adjacent to a pixel to be interpolated. a, b, c, d, e, and f indicate weights respectively applied to the pixels A, B, C, D, E, and F.

Here, the positions of the adjacent pixels A through F used for interpolation may be previously calculated and stored in the form of a table in a system, and the pixels A through F may be retrieved from the table for use in interpolation. Alternatively, the positions of adjacent pixels used for interpolation of a pixel to be interpolated may be calculated using a predetermined equation at every interpolation.

½ pixel-based interpolation can also be applied to ¼ pixel-based interpolation.

FIG. 16A illustrates a prediction result of H.264 according to the prior art, and FIG. 16B illustrates a prediction result of H.264 according to an exemplary embodiment of the present invention.

In H.264 according to the prior art, a distorted portion of an annular image is not correctly referred to and a blocking effect occurs in a portion of the annular image. On the other hand, in H.264 according to an exemplary embodiment of the present invention where interpolation is performed based on the direction of the distortion of an annular image, an image is predicted without a blocking effect.

As described above, according to an exemplary embodiment of the present invention, pixel interpolation in encoding/decoding of an annular image is performed using reference pixels according to the distorted shape of the annular image, instead of using reference pixels in a vertical or horizontal direction, thereby effectively performing prediction with the maximal use of the characteristic of the annular image.

Meanwhile, the method of encoding/decoding an annular image can also be embodied as a computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Function programs, code, and code segments for implementing the method of encoding/decoding an annular image can be easily construed by programmers in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A computer-implemented method for interpolating an object reference pixel in an annular image, the method comprising using a computer to carry out the steps of:
   selecting a plurality of reference pixels located in a direction of a distortion of the annular image;
   interpolating the object reference pixel to be interpolated based on the selected plurality of reference pixels;
   wherein the plurality of reference pixels are exclusively located on one single circumference of a circle having a radius between a center of the annular image and the object reference pixel and are located within a predetermined distance from the object reference pixel.

2. The method of claim 1, wherein the selection of the plurality of reference pixels comprises selecting the plurality of reference pixels using positions of the plurality of reference pixels, which are determined using a predetermined equation.

3. The method of claim 1, wherein the selection of the plurality of reference pixels comprises selecting the plurality of reference pixels using a table that stores positions of the plurality of reference pixels located on the circumference of the circle.

4. The method of claim 1, wherein the object reference pixel is a ½ pixel or a ¼ pixel.

5. The method of claim 1, wherein the interpolation of the object reference pixel comprises:
   applying different predetermined weights to the plurality of reference pixels; and
   obtaining the object reference pixel by adding the reference pixels to which the different predetermined weights are applied.

6. An apparatus for interpolating an object reference pixel in an annular image, the apparatus comprising:
   a reference pixel selecting unit for selecting a plurality of reference pixels located in a direction of a distortion of the annular image; and
   an interpolating unit for interpolating the object reference pixel to be interpolated based on the selected plurality of reference pixels;
   wherein the plurality of reference pixels are exclusively located on one single circumference of a circle having a radius between a center of the annular image and the object reference pixel and are located within a predetermined distance from the object reference pixel.

7. The apparatus of claim 6, wherein the reference pixel selecting unit selects the plurality of reference pixels using positions of the plurality of reference pixels, which are determined using a predetermined equation.

8. The apparatus of claim 6, wherein the reference pixel selecting unit selects the plurality of reference pixels using a table that stores positions of the plurality of reference pixels located on the circumference of the circle.

9. The apparatus of claim 6, wherein the object reference pixel is a ½ pixel or a ¼ pixel.

10. The apparatus of claim 6, wherein the interpolating unit applies different predetermined weights to the plurality of reference pixels and obtains the object reference pixel by adding the reference pixels to which the predetermined different weights are applied.

11. A method of encoding an annular image, the method comprising:
    interpolating an object reference pixel to be interpolated based on a plurality of reference pixels exclusively located on one single circumference of a circle having a radius between a center of the annular image and a position of the object reference pixel to perform motion estimation on the annular image, thereby determining a prediction macroblock for a current macroblock; and
    performing a discrete cosine transform (DCT) on a difference between the prediction macroblock and the current macroblock, quantizing DCT coefficients, reordering the quantized DCT coefficients, and entropy-encoding the reordered DCT coefficients.

12. An apparatus for encoding an annular image, the apparatus comprising:
    a motion estimation and compensation unit for interpolating an object reference pixel to be interpolated based on a plurality of reference pixels exclusively located on one single circumference of a circle having a radius between a center of the annular image and a position of the object reference pixel to perform motion estimation on the annular image, thereby determining a prediction macroblock for a current macroblock;

a discrete cosine transform (DCT) unit for performing a DCT on a difference between the prediction macroblock and the current macroblock;

a quantization unit for quantizing DCT coefficients;

a reordering unit for reordering the quantized DCT coefficients; and an entropy encoding unit for entropy-encoding the reordered DCT coefficients.

13. A method of decoding an annular image, the method comprising:

entropy-decoding a received encoded bitstream, reordering entropy-decoded data samples, inversely quantizing the reordered data samples, and performing an inverse discrete cosine transform (DCT) on the inversely quantized data samples, thereby generating inverse DCT coefficients;

interpolating an object reference pixel to be interpolated based on a plurality of reference pixels exclusively located on one single circumference of a circle having a radius between a center of the annular image and a position of the object reference pixel, thereby determining a prediction macroblock for a current macroblock; and adding a macroblock comprising the inverse DCT coefficients and the prediction macroblock.

14. An apparatus for decoding an annular image, the apparatus comprising:

an entropy decoding unit for entropy-decoding a received encoded bitstream;

a reordering unit for reordering entropy-decoded data samples;

an inverse quantization unit for inversely quantizing the reordered data samples;

an inverse discrete cosine transform (DCT) unit for generating inverse DCT coefficients by performing an inverse DCT on the inversely quantized data samples;

a motion compensation unit for interpolating an object reference pixel to be interpolated based on a plurality of reference pixels exclusively located on one single circumference of a circle having a radius between a center of the annular image and a position of the object reference pixel, thereby determining a prediction macroblock for a current macroblock; and an adder for adding a macroblock comprising the inverse DCT coefficients and the prediction macroblock.

* * * * *